(12) United States Patent
Mine

(10) Patent No.: US 8,112,101 B2
(45) Date of Patent: Feb. 7, 2012

(54) COMMUNICATION TERMINAL, POSITION NOTIFICATION METHOD, AND COMMUNICATION SYSTEM

(75) Inventor: Masaya Mine, Tokyo (JP)

(73) Assignee: NEC Toshiba Space Systems, Ltd., Tokyo (JP)

( * ) Notice: Subject to any disclaimer, the term of this patent is extended or adjusted under 35 U.S.C. 154(b) by 772 days.

(21) Appl. No.: 11/558,573

(22) Filed: Nov. 10, 2006

(65) Prior Publication Data

US 2007/0123210 A1 May 31, 2007

(30) Foreign Application Priority Data

Nov. 22, 2005 (JP) ................................. 2005-337103

(51) Int. Cl.
*H04B 1/06* (2006.01)
*H04B 1/38* (2006.01)
*G08G 1/123* (2006.01)
*G01C 21/00* (2006.01)

(52) U.S. Cl. .................. 455/456.6; 455/343.1; 455/574; 340/988; 701/213

(58) Field of Classification Search .............. 455/456.3, 455/464, 343.1, 574; 340/989, 825.44; 701/200, 701/213
See application file for complete search history.

(56) References Cited

U.S. PATENT DOCUMENTS

| | | | | |
|---|---|---|---|---|
| 6,229,988 B1 * | 5/2001 | Stapefeld et al. | ............ | 340/7.35 |
| 6,337,641 B1 * | 1/2002 | Yoshioka et al. | ............. | 340/989 |
| 2002/0032035 A1 * | 3/2002 | Teshima | ........................ | 455/456 |
| 2002/0077159 A1 * | 6/2002 | Jiang | ............................. | 455/572 |
| 2003/0060212 A1 | 3/2003 | Thomas | | |

FOREIGN PATENT DOCUMENTS

| | | |
|---|---|---|
| JP | 2000-308126 | 11/2000 |
| JP | 2003-224683 | 8/2003 |
| JP | 2003-224886 | 8/2003 |
| JP | 2003-259426 | 9/2003 |
| JP | 2004-112126 | 4/2004 |
| JP | 2005-151488 | 6/2005 |
| JP | 2005-197820 | 7/2005 |
| KR | 2002-0067467 | 11/2002 |
| KR | 10-2006-0114355 | 11/2007 |
| WO | PCT/DK99/00548 | 4/2000 |
| WO | WO 00/22860 | 4/2000 |

OTHER PUBLICATIONS

The Office Action issued by the Korean Patent Office on Nov. 21, 2007, with English language translation, pp. 1 to 11.
An European Search Report issued by the European Patent Office on Feb. 14, 2007, pp. 1 to 6.
Japanese Office Action with Translantions.

* cited by examiner

*Primary Examiner* — George Eng
*Assistant Examiner* — Nizar Sivji
(74) *Attorney, Agent, or Firm* — Whitham Curtis Christofferson & Cook, PC

(57) ABSTRACT

A communication terminal which communicates with a communication device includes a position detecting section which detects a current position of the communication terminal, and a control section which automatically notifies the communication device of the current position obtained from the position detecting section, in response to an instruction from the communication device.

5 Claims, 3 Drawing Sheets

COMMUNICATION TERMINAL, POSITION NOTIFICATION METHOD, AND COMMUNICATION SYSTEM

BACKGROUND OF THE INVENTION

1. Field of the Invention

The present invention relates to a communication terminal, a position notification method, and a communication system.

2. Description of the Related Art

In recent years, there have been increased needs for a portable communication terminal such as a cellular phone, capable of knowing its own current position, so communication terminals meeting such the needs have been developed. For example, JP 2003-259426 A discloses a communication terminal which notifies its own current position obtained from a Global Positioning System (GPS) or a radio base station, to another communication device through a manual operation of an operator. However, when the operator cannot operate the communication terminal, the communication terminal cannot notify its own current position to another communication device.

JP 2005-197820 A discloses a technique of allowing a communication terminal to automatically notify its own current position to a predetermined notification destination in a case where the communication terminal is capable of communicating with a particular radio base station, e.g., a mobile radio base station mounted on a rescue helicopter. However, in a case where the communication terminal is located outside the communication area of the mobile radio base station, the communication terminal cannot notify its own current position to the predetermined notification destination.

SUMMARY OF THE INVENTION

The present invention has been made to solve the above-mentioned problems. An exemplary feature of the present invention is to provide a communication terminal, a position notification method, and a communication system, for allowing a person who wants to know the current position of the communication terminal to positively know the current position thereof, irrespective of the situation of the communication terminal.

In a first aspect of the present invention, a communication terminal which communicates with a communication device includes a position detecting section which detects a current position of the communication terminal, and a control section which automatically notifies the communication device of the current position obtained from the position detecting section, in response to an instruction from the communication device.

In a second aspect of the present invention, a position notification method which is used in a communication terminal communicating with a communication device includes the steps of: receiving a position notification instruction from the communication device; detecting a current position of the communication terminal in response to the position notification instruction; and automatically notifying the communication device of the current position.

In a third aspect of the present invention, a communication system includes a communication terminal and a communication device communicating with the communication terminal. The communication device issues a position notification instruction to the communication terminal. The communication terminal automatically notifies the communication device of a current position of the communication terminal in response to the position notification instruction.

According to the present invention, the person who wants to know the current position of the communication terminal may know the current position thereof whatever situation the communication terminal is in. For example, even when the communication terminal is not operated, or even while the communication terminal is being moved, the person may know the current position thereof.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Figure 1:
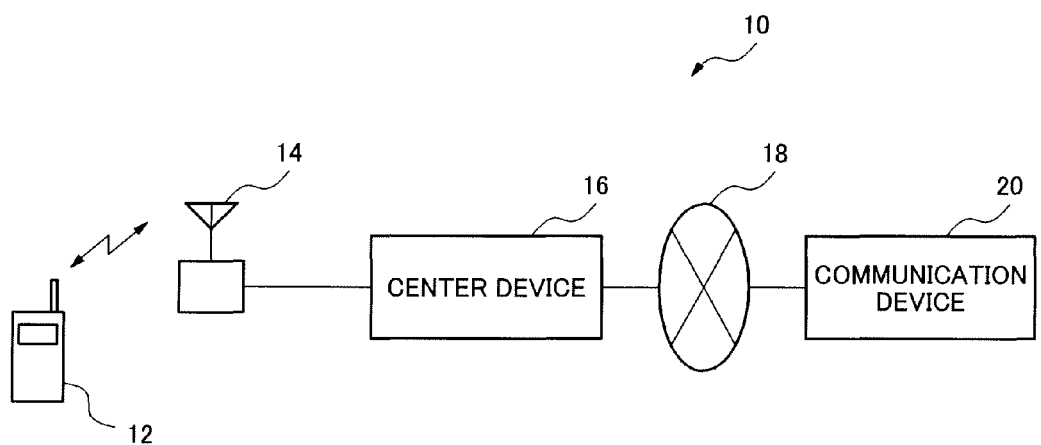
FIG. 1 is a control block diagram of a communication system according to an embodiment of the present invention.

FIG. 1 is a control block diagram of a communication system 10 according to an embodiment of the present invention. The communication system 10 includes a communication terminal 12, a center device 16 for managing a radio base station 14 which communicates with the communication terminal 12 by radio, and a communication device 20 connected with the center device 16 via a communication network 18 such as the Internet. The communication terminal 12 detects its own current position and notifies the detected position to the communication device 20, in response to an instruction received from the communication device 20 via the communication network 18, the center device 16, and the radio base station 14.

Figure 2:
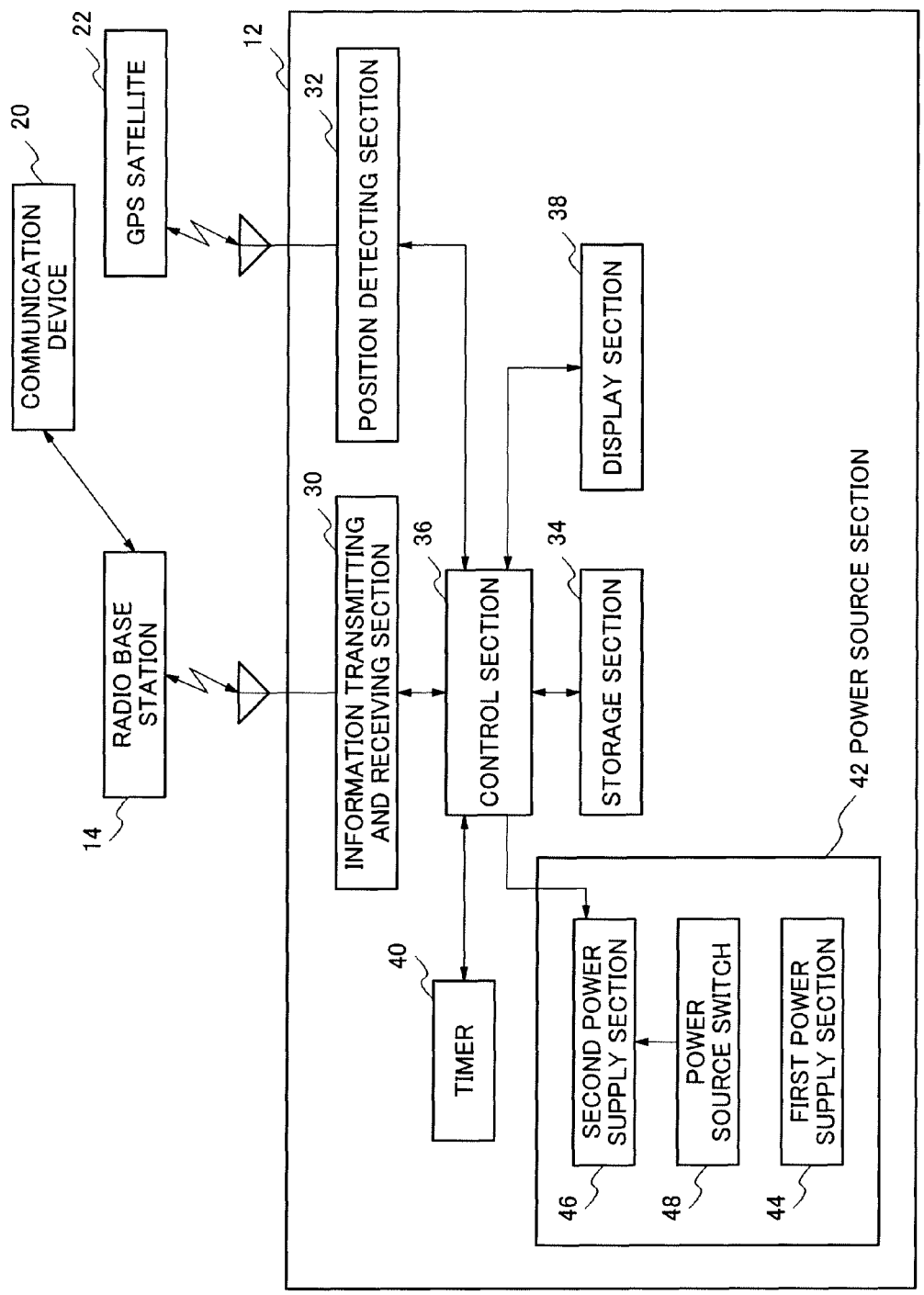
FIG. 2 is a control block diagram of a communication terminal shown in FIG. 1.

FIG. 2 is a control block diagram of the communication terminal 12. The communication terminal 12 includes an information transmitting and receiving section 30, a position detecting section 32, a storage section 34, a control section 36, a display section 38, a timer 40, and a power source section 42.

The information transmitting and receiving section 30 transmits and receives information to and from the communication device 20 via the radio base station 14. The position detecting section 32 detects the current position of the communication terminal 12 using a radio wave sent from a GPS satellite 22. The control section 36 obtains the current position of the communication terminal 12 from the position detecting section 32. Methods in which the control section 36 obtains the current position of the communication terminal 12 from the position detecting section 32 are described below. The control section 36 issues an instruction to the position detecting section 32 to detect the position. In response to the instruction, the position detecting section 32 detects the current position of the communication terminal 12 and sends the detected position to the control section 36. Alternatively, the control section 36 reads the current position of the communication terminal 12 from a predetermined storage area in which the latest position of the communication terminal 12 is always stored by the position detecting section 32.

The storage section 34 stores a program executed by the control section 36, data necessary to execute the program, and the like.

The control section 36 includes a central processing unit (CPU), and executes the program stored in the storage section 34 to control the entire communication terminal 12. The control section 36 basically receives information from the communication device 20 via the information transmitting and receiving section 30 and executes processing based on the information. For example, if the received information is an instruction to notify the current position of the communication terminal 12, the control section 36 obtains the current position of the communication terminal 12 from the position detecting section 32 by using either one of the above-mentioned acquisition methods. The control section 36 notifies the communication device 20 of the obtained current position.

The display section 38 is composed of a visible display device such as a liquid crystal display (LCD) device or a light emitting diode (LED) device, an audible indication device such as a speaker, or a vibrator.

The timer 40 measures a given period of time which is set by the control section 36, and outputs an interrupt signal at least to the control section 36 every time when the given period of time elapses.

The power source section 42 includes a first power supply section 44, a second power supply section 46, and a power source switch 48. The first power supply section 44 continuously supplies power to the information transmitting and receiving section 30, the storage section 34, and the control section 36. The second power supply section 46 supplies power at least to the position detecting section 32 in response to an instruction from the control section 36 or a turning-on operation of the power source switch 48. When the power source switch 48 is turned off, or when an instruction related to power off is received from the control section 36, the second power supply section 46 stops supplying power to all sections included in the communication terminal 12 except the information transmitting and receiving section 30, the storage section 34, and the control section 36.

Figure 3:
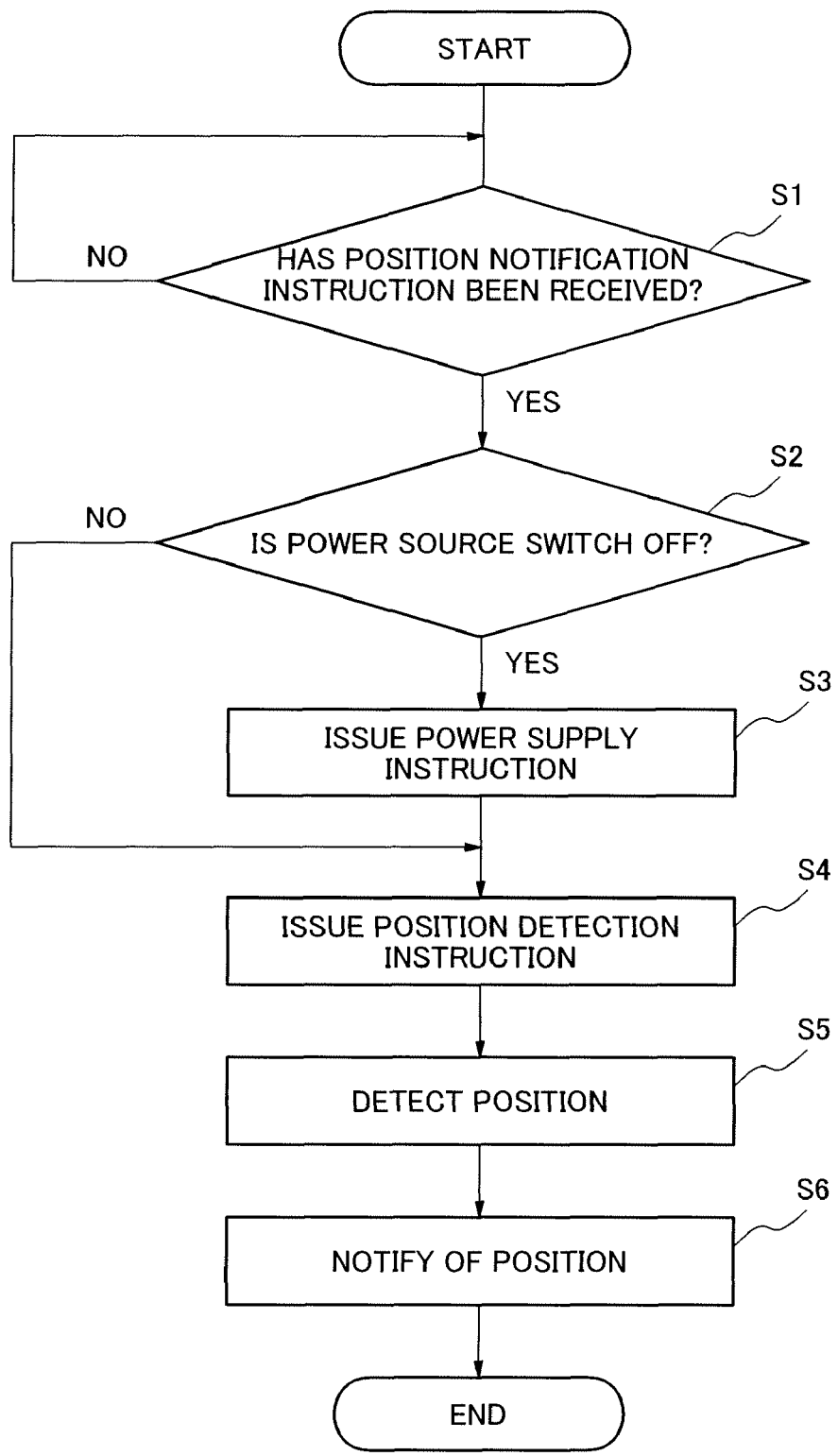
FIG. 3 is a flowchart of a representative operation example of the communication terminal.

FIG. 3 is a flowchart of a representative operation example of the communication terminal 12 described above. As described above, the information transmitting and receiving section 30, the storage section 34, and the control section 36 are continuously supplied with power from the first power supply section 44. First, the communication device 20 determines a communication terminal 12 whose current position is to be detected, in response to an instruction from a person who wants to know the current position of the communication terminal 12, and issues a position notification instruction to the communication terminal 12.

The control section 36 judges whether the information transmitting and receiving section 30 has received the position notification instruction from the communication device 20 (Step S1). When the information transmitting and receiving section 30 has received the position notification instruction, the control section 36 judges whether the power supply switch 48 of the communication terminal 12 is on or off (Step S2). When it is judged that the power supply switch 48 is off, the control section 36 issues an instruction to the second power supply section 46 to supply power at least to the position detecting section 32 (Step S3). When it is judged that the power supply switch 48 is on (NO: Step S2) or after the control section 36 issues an instruction to the second power supply section 46 (Step S3), the control section 36 issues an instruction to the position detecting section 32, which has been supplied with power to be ready to operate, to detect the current position of the communication terminal 12 (Step S4). The position detecting section 32 detects the current position of the communication terminal 12 using a radio wave sent from the GPS satellite 22 (Step S5). The control section 36 obtains the current position of the communication terminal 12 from the position detecting section 32 by one of the above-mentioned acquisition methods, and notifies the communication device 20 of the obtained position (Step S6).

The communication device 20 receives the current position of the communication terminal 12 and displays the position on a predetermined display unit.

As described above, in a state where the communication terminal 12 can communicate with the radio base station 14, the communication terminal 12 can always notify of the current position thereof in response to a request from the communication device 20. In addition, the notification is automatically performed. Therefore, a person who wants to know the current position of the communication terminal 12 can surely know the current position thereof even when the communication terminal 12 cannot be operated or even while the communication terminal 12 is being moved.

In addition, the communication terminal 12 can notify its own current position to the communication device 20 even when the power supply switch 48 is off. Therefore, even when the communication terminal 12 is left with the power being off, the person who wants to know the current position of the communication terminal 12 can know the current position thereof.

When it is judged in the process flow that the power supply switch 48 is off, the control section 36 can issue an instruction to the second power supply section 46 to stop supplying power to the position detecting section 32, upon completion of the position notification to the communication device 20. With this operation, unnecessary power consumption of the communication terminal 12 is suppressed.

The position detecting section 32 may not always be supplied with power from the second power supply section 46. For example, the position detecting section 32 can be continuously supplied with power from the first power supply section 44 regardless of whether an instruction is issued from the control section 36.

The communication device 20 can issue a repetitive-notification instruction to the communication terminal 12. The repetitive-notification instruction instructs the communication terminal 12 to notify of its own current position repeatedly. A notifying-time interval value is added to the repetitive-notification instruction. Upon reception of the repetitive-notification instruction, the control section 36 sets the notifying-time interval value in a counter register of the timer 40. The control section 36 starts the timer 40, and monitors a time-out interrupt from the timer 40. Upon detection of the time-out interrupt, the control section 36 obtains the current position of the communication terminal 12 from the position detecting section 32 and notifies the communication device 20 of the obtained current position. This repetitive-notification operation ends when a stop instruction is received from the communication device 20, when the repetitive-notification operation is performed the target number of times of notifications, or the like.

Accordingly, the person who wants to know the current position of the communication terminal 12 can surely know the current position thereof even while the communication terminal 12 is being moved. In addition, the communication device 20 has only to issue the repetitive-notification instruction once, and does not need to issue a position notification instruction every time when position notification is to be received. Therefore, the processing load of the communication device 20 and the work load of the person who wants to know the current position of the communication terminal 12 are reduced.

The communication device 20 can issue a position notification instruction with authentication code to the communication terminal 12. The authentication code is either a code unique to the communication device 20 issuing the position notification instruction or a code identifying a user issuing the position notification instruction. The user identification code may, for example, be a password, barcode, or biometric identification code. Upon reception of the position notification instruction with authentication code, the control section 36 judges the validity of the authentication code given to the position notification instruction, i.e., judges whether the authentication code is identical to a code that has been registered in the storage section 34 in advance, for example. When the authentication code agrees with a code that has been registered in the storage section 34 in advance, the control section 36 notifies the communication device 20 of the current position of the communication terminal 12. When the authentication code disagrees with the code that has been registered in advance, the control section 36 notifies the communication device 20, which has transmitted the authentication code, that the authentication code disagrees.

The above-mentioned processing prevents the current position of the communication terminal 12 that is important information from leaking to an unrelated third party.

The communication device 20 can also transmit only the authentication code to the communication terminal 12 separately from the position notification instruction. Further, the communication device 20 can transmit the authentication code in response to an authentication code transmission request from the communication terminal 12.

The communication device 20 can issue a confidential position notification instruction to the communication terminal 12. The confidential position notification instruction instructs the communication terminal 12 to notify the communication device 20 of the current position of the communication terminal 12 while keeping the operator of the communication terminal 12 from recognizing this position notification. Upon reception of the confidential position notification instruction, the control section 36 sets a representation prohibition flag on in the storage section 34. While the representation prohibition flag is on, the control section 36 suppresses all representation processings related to the position notification, such as, displaying the position notification on the LED, announcing the position notification from the speaker, or representing the position notification by vibration caused by the vibrator. In this case, representation processings that are not related to the position notification, e.g., representation processings related to the regular operations of the communication terminal 12, are normally performed without being suppressed. In other words, while the representation prohibition flag is on, the operator of the communication terminal 12 cannot recognize at all that the position is notified. Therefore, even when the communication terminal 12 is used by a malicious third party, the position notification can be surely carried out without being disturbed by this party.

The representation prohibition flag is set off in response to, for example, an instruction to stop the confidential position notification, issued from the communication device 20.

Information on the current position sent from the communication terminal 12 to the communication device 20 is not limited to positional information such as latitude, longitude, and height. For example, the communication terminal 12 is connected to a predetermined map server, or stores a map database in the storage section 34. Then, the communication terminal 12 may convert positional information into map information of a predetermined area including the positional information as coordinate information, and transmit the map information to the communication device 20.

The position detecting section 32 is not limited to have a configuration which detects the position of the communication terminal 12 using a radio wave sent from the GPS satellite 22. For example, the position detecting section 32 may also use position information obtained from the radio base station 14, or use a radio wave sent from a ground radio navigation system such as a long range navigation (LORAN) system.

The communication terminal 12 can be any kind of communication terminal as long as the terminal has the above-described feature. The communication terminal 12 can be a cellular phone, a personal handy phone system (PHS), a personal digital assistant (PDA), a computer, or the like, and can also be a wearable computer, which is put on a person's body for use, like clothes, a bag, or a wrist watch.

The communication device 20 may be any device as long as the device has a communication function. For example, the communication device 20 may be a device similar to the communication terminal 12, a dedicated control device, or a navigation device which is mounted on a vehicle, a vessel, or the like.

The communication network 18 is not limited to the Internet, and may be a public telephone network or a radio communication network, for example.

A radio interface between the communication terminal 12 and the radio base station 14 may be any interface as long as the interface is capable of transmitting and receiving a radio signal therebetween.

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

Further, it is the inventor's intent to retain all equivalents of the claimed invention even if the claims are amended during prosecution.

What is claimed is:

1. A communication system, comprising:
a communication terminal; and
a remote communication device communicating with the communication terminal, wherein:
the communication device issues a position notification instruction to the communication terminal; and
the communication terminal notifies the communication device of a current position of the communication terminal after suppressing representation with which the notifying can be recognized at the communication terminal in response to the position notification instruction, and
wherein the communication terminal comprises
a position detecting section which detects a current position of the communication terminal;
a control section which notifies the communication device of the current position obtained from the position detecting section, in response to an instruction from the communication device; and
a power source section comprising a first power supply section which continuously supplies power to the control section, and a second power supply section which supplies or stops supplying power to all sections of the communication terminal except at least the control section, wherein the second power supply section supplies power to the position detecting section in response to an instruction of the control section while stopping supply of power to other sections.

2. A communication system according to claim 1, wherein when the instruction received from the communication device instructs to repeatedly notify of the current position of the communication terminal, the control section of the communication terminal repeatedly notifies, in a predetermined cycle, the communication device of the current position of the communication terminal.

3. A communication system according to claim 2, wherein when an authentication code received from the communication device agrees with a code that has been registered in the communication terminal in advance, the control section notifies the communication device of the current position of the communication terminal.

4. A communication terminal which communicates with a remote communication device, comprising:
 a position detecting section which detects a current position of the communication terminal;
 a control section which notifies the remote communication device of the current position obtained from the position detecting section, in response to an instruction from the remote communication device; and
 a power source section comprising a first power supply section for continuously supplying power to the control section and a second power supply section for supplying power or stopping the supplying of power to all sections of the communication terminal except at least the control section,
 wherein the second power supply section supplies power to at least the position detecting section in response to an instruction of the control section while stopping the supplying of power to other sections and stops the supply of power when receiving another instruction which is issued by the control section after completing the notifying of the current position,
 wherein when the instruction received from the communication device instructs to notify the communication device of the current position of the communication terminal while keeping an operator of the communication terminal from recognizing this position notification, the control section suppresses representation with which notifying the communication device of the current position can be recognized.

5. A position notification method which is used in a communication terminal communicating with a remote communication device, comprising the steps of:
 continuously supplying power to a control section of the communication terminal;
 supplying power or stopping the supplying power to all sections of the communication terminal except at least the control section;
 receiving by the control section a position notification instruction from the communication device;
 supplying power to at least a position detecting section of the communication terminal in response to the position notification instruction received by the control section while stopping the supplying power to other sections;
 detecting a current position of the communication terminal in response to the position notification instruction; and
 notifying the communication device of the current position of the communication terminal,
 wherein when the instruction received from the communication device instructs to notify the communication device of the current position of the communication terminal while keeping an operator of the communication terminal from recognizing the position notification, further comprising the step of suppressing representation with which notifying the communication device of the current position of the communication terminal can be recognized.

\* \* \* \* \*